US009764610B2

(12) United States Patent
McCall et al.

(10) Patent No.: US 9,764,610 B2
(45) Date of Patent: Sep. 19, 2017

(54) HITCH BALL WITH LOCKING BAIL

(71) Applicant: B & W Custom Truck Beds, Inc., Humboldt, KS (US)

(72) Inventors: Travis M. McCall, Humboldt, KS (US); Anthony J. Works, Humboldt, KS (US)

(73) Assignee: B & W CUSTOM TRUCK BEDS, INC., Humboldt, KS (US)

( * ) Notice: Subject to any disclaimer, the term of this patent is extended or adjusted under 35 U.S.C. 154(b) by 155 days.

(21) Appl. No.: 14/736,999

(22) Filed: Jun. 11, 2015

(65) Prior Publication Data

US 2015/0360528 A1   Dec. 17, 2015

Related U.S. Application Data

(60) Provisional application No. 62/011,939, filed on Jun. 13, 2014.

(51) Int. Cl.
*B60D 1/28* (2006.01)
*B60D 1/06* (2006.01)
*B60D 1/36* (2006.01)
*B60D 1/48* (2006.01)
*B60D 1/52* (2006.01)

(52) U.S. Cl.
CPC .............. *B60D 1/06* (2013.01); *B60D 1/488* (2013.01); *B60D 1/52* (2013.01)

(58) Field of Classification Search
CPC ............ B60D 1/06; B60D 1/488; B60D 1/52
USPC ........................................................ 280/511
See application file for complete search history.

(56) References Cited

U.S. PATENT DOCUMENTS

| 2,898,797 A * | 8/1959 | Bronstein | F16B 21/165 |
| | | | 411/348 |
| 4,201,400 A * | 5/1980 | Hoogenbosch | B60D 1/52 |
| | | | 280/511 |
| 4,319,766 A * | 3/1982 | Corteg | B60D 1/248 |
| | | | 280/432 |
| 4,433,854 A * | 2/1984 | Smith | B60D 1/07 |
| | | | 280/511 |
| 4,522,421 A * | 6/1985 | Vance | B60D 1/06 |
| | | | 280/416.1 |

(Continued)

OTHER PUBLICATIONS

OE Series by Pullrite, Oct. 1, 2014, Gooseneck Owner's Manual for Ford and Dodge Tow Prep Kits, pp. 1-7, i-ii.

*Primary Examiner* — Tony Winner
(74) *Attorney, Agent, or Firm* — Erickson Kernell IP, LLC

(57) ABSTRACT

A hitch ball with a locking bail for use with gooseneck hitch assemblies. The hitch ball includes a hitch ball body having a ball-mount on a first end. A second end forms a base that is insertable into a mating receiver mounted in a tow vehicle. A locking bail is pivotably coupled to the hitch ball body and is moveable from an unlocked orientation overlying the ball-mount to a locked orientation extending generally transversely to the hitch ball body. The locking bail is configured to function as a handle when in the unlocked orientation to provide a clean and easily graspable structure for handling and installing the hitch ball in a tow vehicle. The locking bail prevents coupling of a trailer or hitch assembly with the hitch ball when in the unlocked orientation and provides a visual indication of the locked or unlocked state of the hitch ball.

18 Claims, 7 Drawing Sheets

(56) References Cited

U.S. PATENT DOCUMENTS

| | | | |
|---|---|---|---|
| 4,938,496 A * | 7/1990 | Thomas | B60D 1/06 280/511 |
| 6,616,168 B2 | 9/2003 | Belinky | |
| 6,837,511 B1 | 1/2005 | Johnson, III | |
| 8,011,685 B2 | 9/2011 | Belinky et al. | |
| 2013/0127137 A1 | 5/2013 | McCoy et al. | |
| 2014/0265252 A1 | 9/2014 | Mida et al. | |

* cited by examiner

HITCH BALL WITH LOCKING BAIL

CROSS REFERENCE TO RELATED APPLICATION

This application claims the benefit of provisional patent application Ser. No. 62/011,939, filed Jun. 13, 2014.

BACKGROUND

Gooseneck trailers are commonly used for a variety of purposes, ranging from hauling livestock or construction machinery to recreational use such as camper-trailers. Gooseneck trailers are typically coupled directly to the tow vehicle using a hitch ball mounted to the frame of the tow vehicle, such as in the bed of pick-up truck.

A drawback to mounting a hitch ball on the tow vehicle is that the hitch ball limits use of the tow vehicle for purposes other than towing. For example, when mounted in the bed of a pick-up truck, the hitch ball protrudes upward from the bed and can interfere with loading and unloading of items in the bed. Accordingly, manufacturers have provided a variety of assemblies and hitch balls that enable removal of the hitch ball when not in use.

These assemblies and hitch balls present their own drawbacks. It can be difficult to discern whether the hitch ball is engaged and/or locked in position when installing it in the tow vehicle. Grease and grime collect on the hitch ball during use. Such grime can make gripping and handling of the hitch ball during installation and removal of the hitch ball from the tow vehicle a difficult and messy process.

There is thus a need for a removable hitch ball that provides a visual and/or audible indication of its engagement with the tow vehicle. There is also a need for a hitch ball that can be easily handled and that can be handled without transferring grease or grime onto the user.

SUMMARY

Embodiments of the invention are defined by the claims below, not this summary. A high-level overview of various aspects of the invention is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, a hitch ball with a locking bail that is useable as a handle and as an actuator for a locking mechanism.

The hitch ball includes an elongate hitch ball body with a ball-mount disposed on its top end and a base insertable into a receiver of a vehicle disposed on its bottom end. A locking mechanism is disposed within the hitch ball body. The locking mechanism includes a locking piston or plunger disposed in a hollow extending into the bottom end of the hitch ball body. The locking piston is slideable within the hollow to selectively obstruct movement of one or more locking bearings within a corresponding number of ports in the base and into the hitch ball body. An actuation assembly that includes a bail or lever is provided in engagement with the locking mechanism and can be pivoted to move the locking piston between locked and unlocked orientations. The bail also functions as a handle for manually engaging and moving the hitch ball.

In the unlocked orientation, the bail is positioned to extend in a spaced relationship with the ball-mount which prevents coupling of a trailer coupler with the ball-mount. In one embodiment, when the lever is pivoted to advance the locking mechanism to the unlocked orientation, the bail overlies the ball-mount and generally inline with the length of the hitch ball body. As such, the bail provides a visual indication that the hitch ball is unlocked from the tow vehicle receiver, prevents coupling of a trailer or hitch assembly with the hitch ball, and provides a convenient and clean gripping location for handling of the hitch ball by a user.

In the locked orientation, the bail is pivoted so as not to interfere with coupling of a trailer coupler to the ball-mount. In one embodiment, the bail is pivoted to extend generally perpendicular to the length of the hitch ball body and is biased laterally to engage a notch in the hitch ball body. When the lever is pivoted to the non-interfering orientation, the locking piston is moved by the bail to force the locking bearings radially outwardly from the hitch ball body to engage the receiver in the tow vehicle. The bail thus, provides a visual, audible, and/or tactile indication when the locked orientation is achieved. The hitch ball is also prevented from becoming inadvertently unlocked during use by engagement of the bail with the notch and by obstruction of movement of the bail by a trailer or hitch assembly coupled to the ball-mount above the bail.

DESCRIPTION OF THE DRAWINGS

Illustrative embodiments of the invention are described in detail below with reference to the attached drawing figures, and wherein.

DETAILED DESCRIPTION

Figure 1:
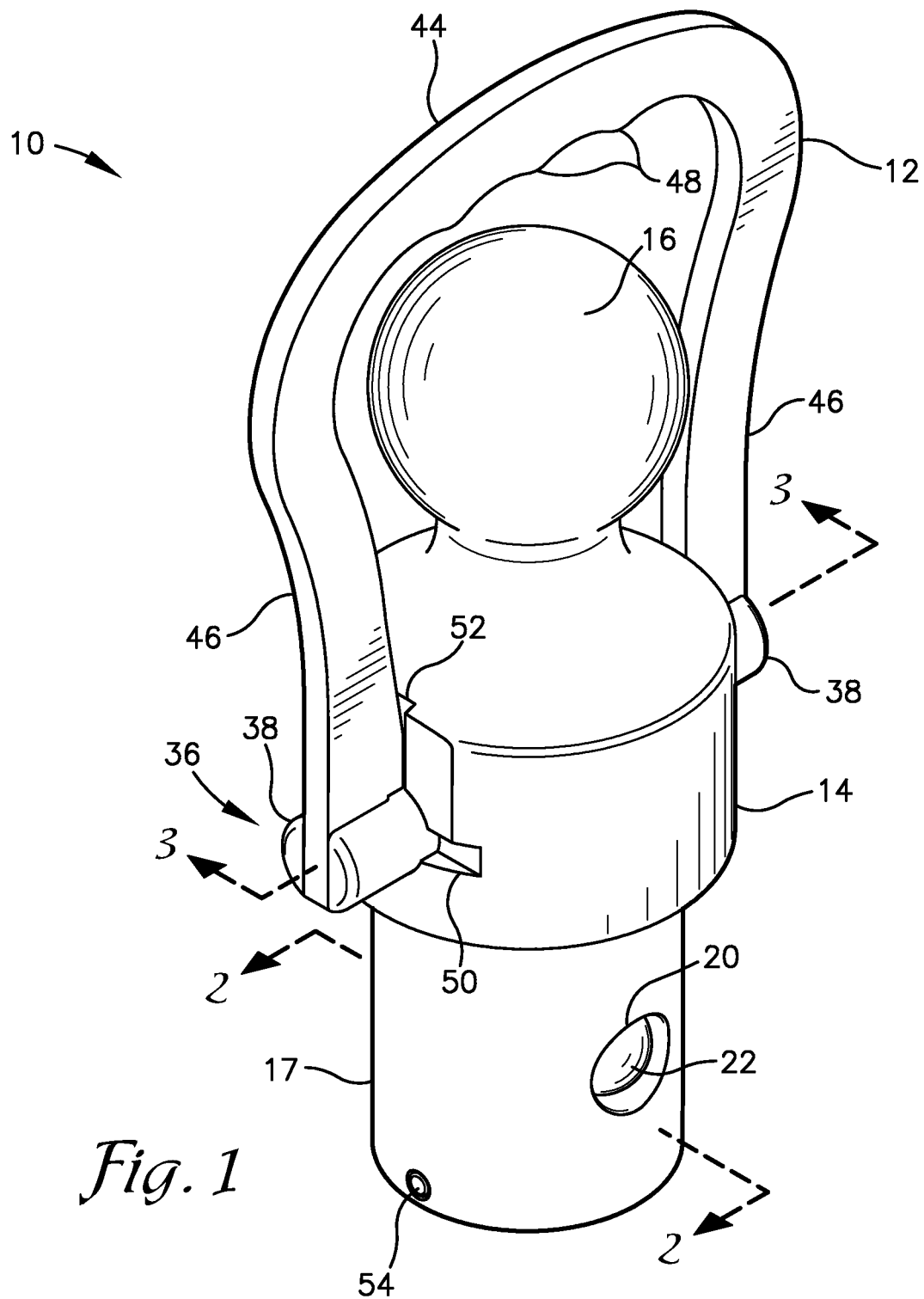
FIG. 1 is a perspective view of a hitch ball with a locking bail in an unlocked orientation depicted in accordance with an embodiment of the invention.

The subject matter of select embodiments of the invention is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described.

With reference to FIGS. 1-7, a hitch ball or hitch ball assembly 10 with a locking bail or lever 12 is described in accordance with an embodiment of the invention. The hitch ball assembly 10 comprises an elongate hitch ball body 14 having a spherically shaped top end forming a ball or ball-mount 16 and a bottom end forming a base 17 configured to be received within a mating receiver disposed in a tow vehicle. The ball-mount 16 is spherical, having dimensions suitable for coupling with a desired gooseneck trailer hitch or other trailering assembly. The ball-mount 16 is preferably integral with the hitch ball body 14 but might alternatively be configured to enable use of interchangeable ball-mounts or spherical heads 16 of different dimensions, or the like. The base 17 is shown as being generally cylindrical to enable receipt thereof in a cylindrical receiver, but can be alternatively shaped to enable use with receivers of varied configurations.

Figure 2:
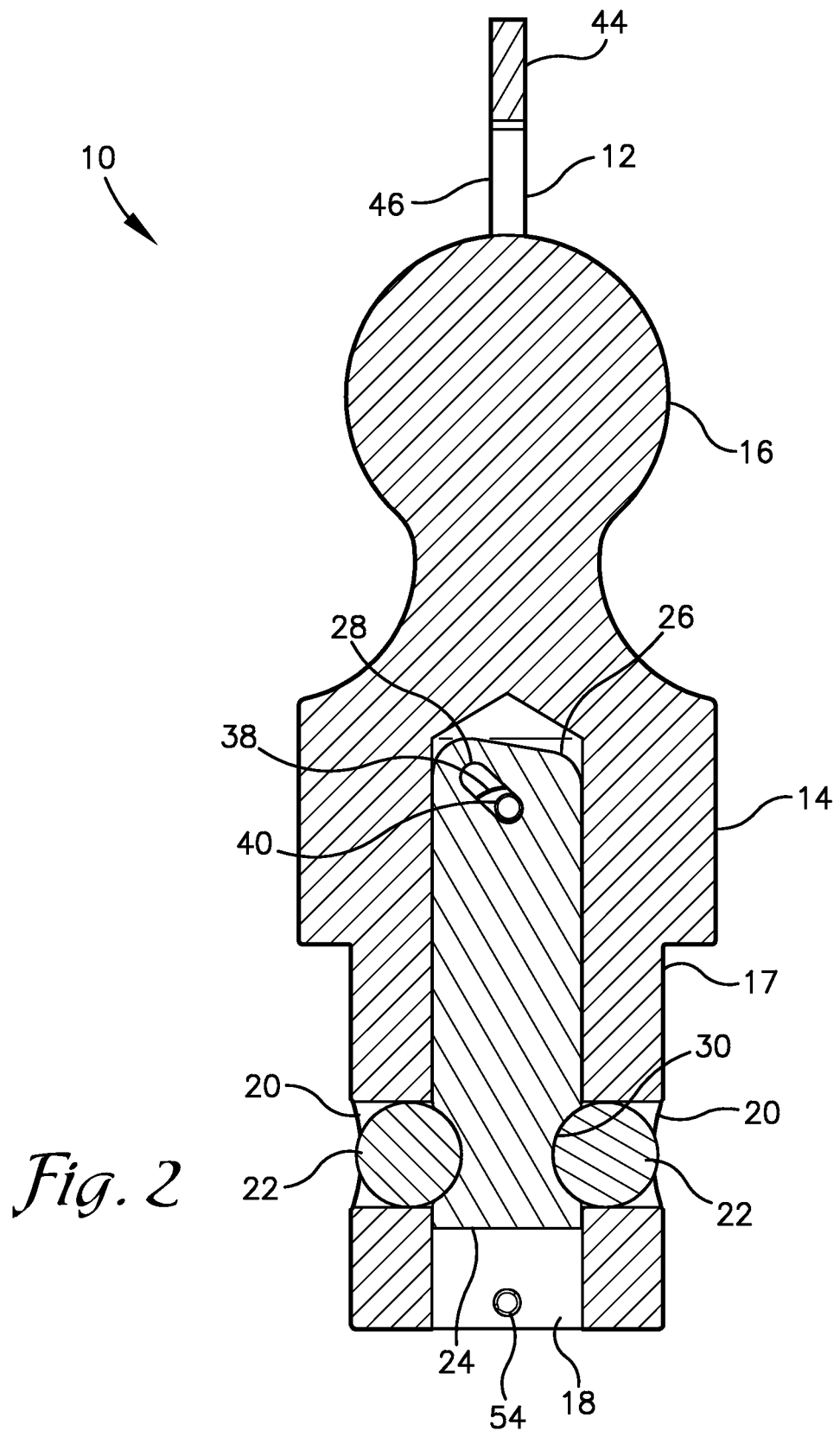
FIG. 2 is cross-sectional side elevational view of the hitch ball taken generally along line 2-2 in FIG. 1.
Figure 3:
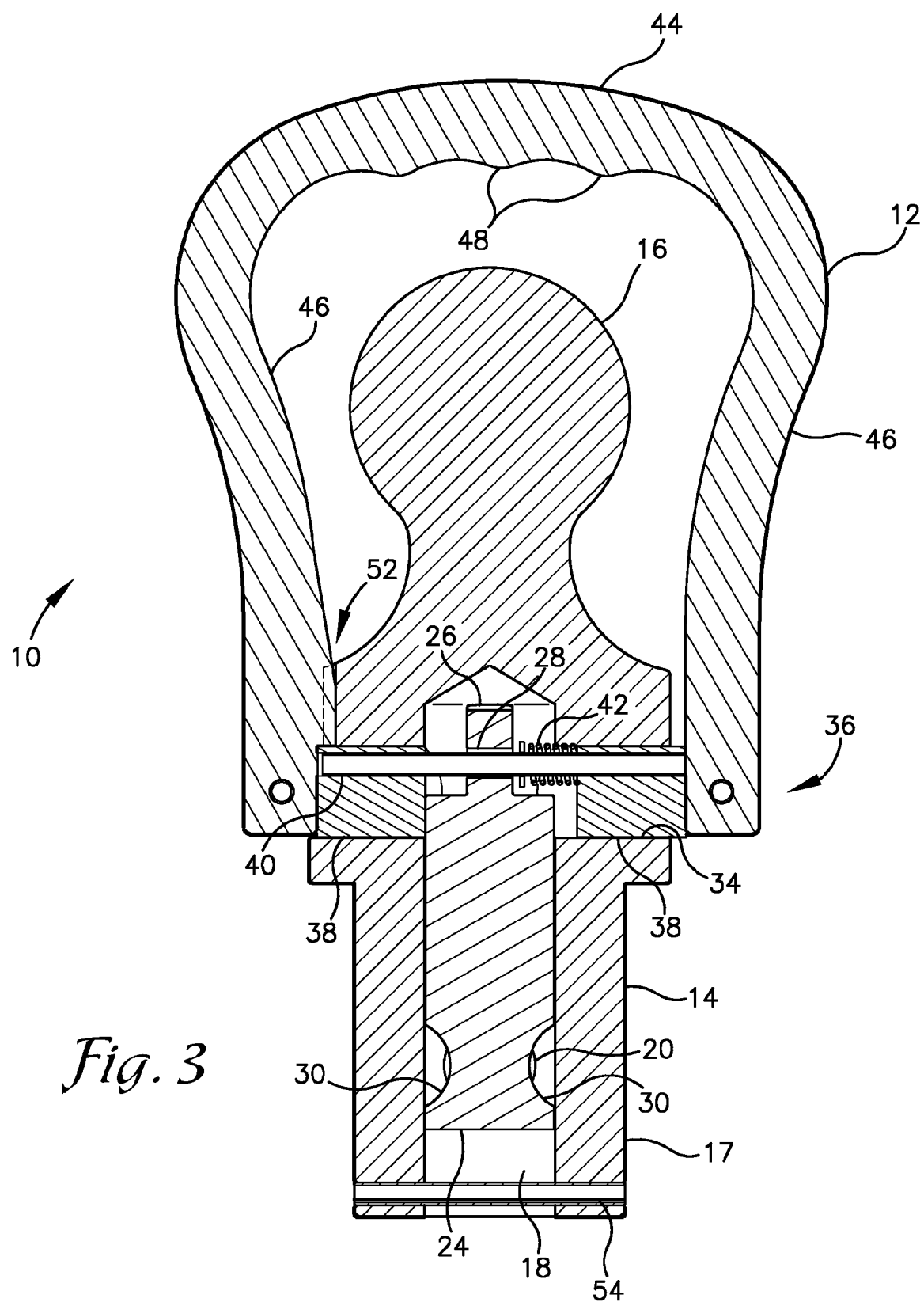
FIG. 3 is a cross-sectional front elevational view of the hitch ball taken generally along line 3-3 in FIG. 1.
Figure 4:
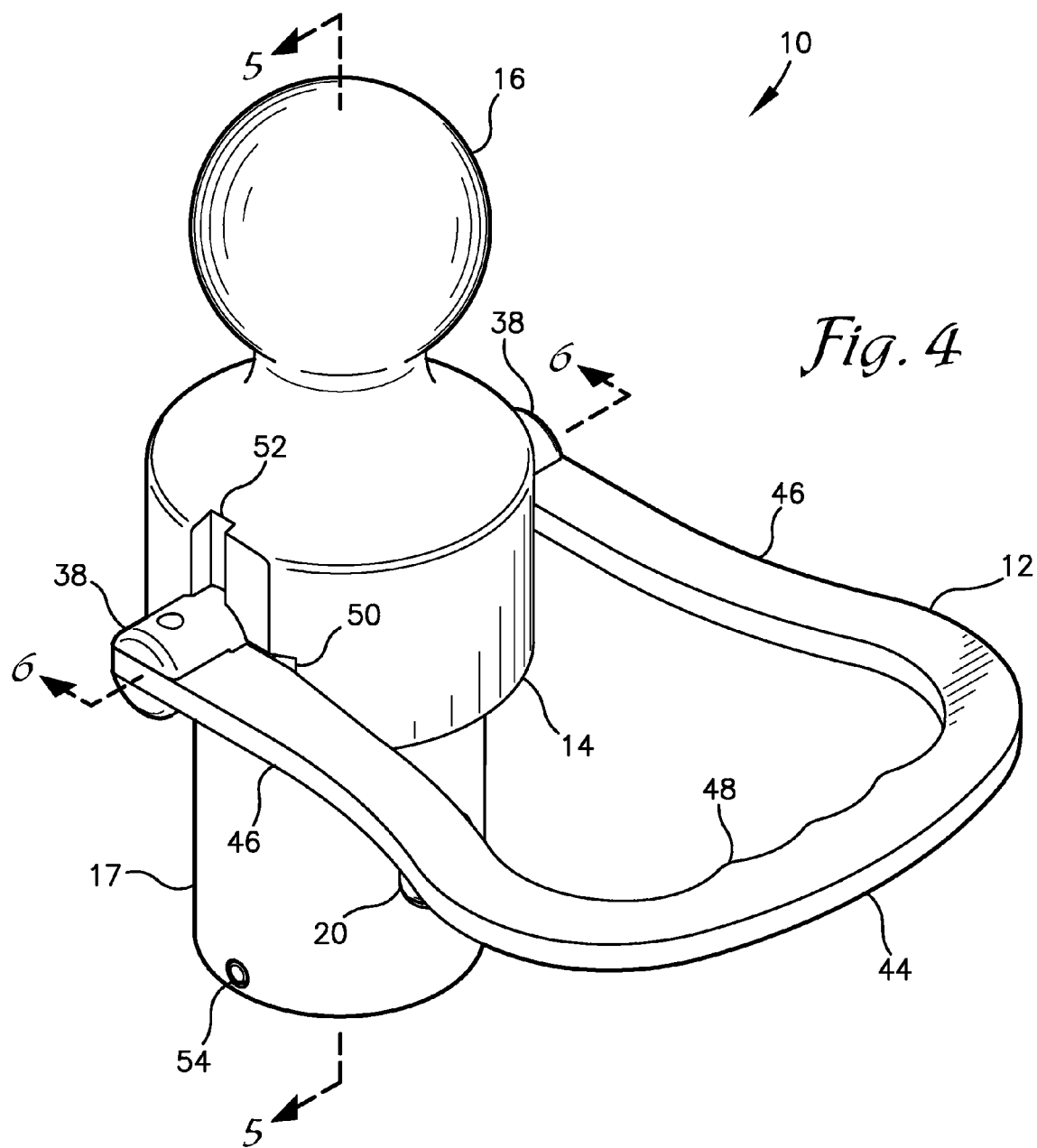
FIG. 4 is a perspective view of the hitch ball of FIG. 1 in a locked orientation depicted in accordance with an embodiment of the invention.
Figure 5:
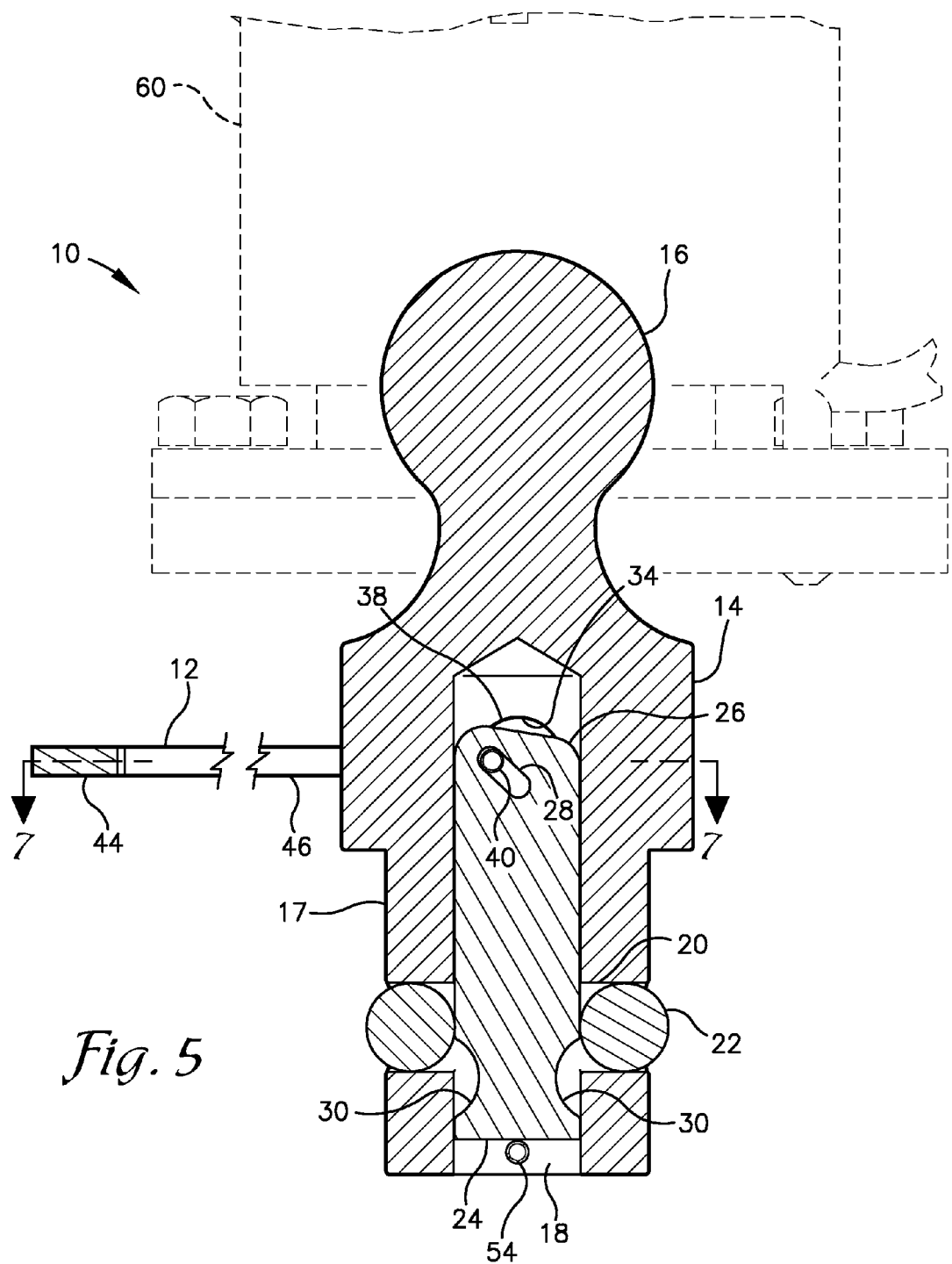
FIG. 5 is a cross-sectional side elevational view of the hitch ball taken generally along line 5-5 in FIG. 4 with a hitch coupler shown in phantom lines to show the relative position of the hitch coupler when coupled to the hitch ball.

The locking bail 12 is connected to a locking mechanism and is moveable relative to the hitch ball body 14 between an unlocked orientation as shown in FIGS. 1-3 and a locked orientation as shown in FIGS. 4-7. In the unlocked orientation, the locking bail 12 extends over the ball mount 16 thereby blocking a trailer coupler from engagement therewith. In the locked orientation, the bail 12 is disposed generally perpendicular to the hitch ball body 14 and allows access to the ball mount 16 for attaching a trailer coupler.

A bore, hole or hollow 18 extends generally coaxially into the hitch ball body 14 from its bottom end and into the base 17. The hollow 18 may comprise a blind hollow having a closed end interior to the hitch ball body 14.

A pair of ports 20 is provided in a sidewall of the base 17. The ports 20 are arranged on diametrically opposite sides of the body 14 and are open to the exterior of the base 17 and to the hollow 18 on the inside of the body 14. An internal diameter of each port 20 is sized to receive a respective locking bearing 22 therein and to enable movement of the bearing 22, such as by rolling or sliding, along the length of the ports 20. A portion of each port 20 nearest to the exterior of the hitch ball body 14 may have a reduced diameter or include a lip, flange, tab, retainer or other feature to prevent the locking bearing 22 from fully escaping the port 20, however the locking bearing 22 must be able to at least partially protrude from the port 20.

A locking piston, plunger or cam follower 24 is slideably disposed within the hollow 18 and is moveable coaxially within the hollow 18. The piston 24 includes a tab 26 which extends from a top end thereof in a direction parallel to the length of the locking piston 24. An oblique slot 28 is disposed in the tab 26 and is positioned at an angle that is between parallel and perpendicular to the direction of the axial movement of the locking piston 24. In the embodiment shown, the oblique slot 28 is oriented at about 45° from the axis of the locking piston 24. The terms "about" or "approximately" as used herein denote deviations from the exact value by +/−10%, preferably by +/−5% and/or deviations in the form of changes that are insignificant to the function.

An annular depression 30 is provided proximate a bottom end of the locking piston 24 and extends at least partially about the circumference of the locking piston 24. The annular depression 30 can be a continuous depression or trough that extends about the circumference of the locking piston 24 or the annular depression 30 can comprise a plurality of separate depressions configured to align with a respective port 20 for at least partial receipt of the locking bearings 22 as described below. The dimensions of the annular depression 30 are sufficient to receive the locking bearings 22 at least partially therein. Although the hitch ball 10 is described herein with a pair of ports 20, locking bearings 22, and associated components the hitch ball 10 can be configured to include any number ports 20, locking bearings 22, and associated components without departing from the scope of embodiments of the invention described herein. For example, the hitch ball 10 might be configured with one, three, ten, or another number of locking bearings 22.

A transverse bore 34 is provided in the hitch ball body 14 to receive an actuation assembly 36. The bore 34 is oriented to extend through the diameter of the hitch ball body 14 at a location between the ball-mount 16 and the base 17 of the hitch ball body 14. The actuation assembly 36 includes a pair of bail axles 38, a cam pin 40, and the locking bail 12. The bail axles 58 are disposed in the transverse bore 34; one axle 38 disposed at each end of the bore 34. The bail axles 38 are slideable in an axial direction along the length of the bore 34 and are rotatable within the bore 34 about the axis of the bore 34. Each bail axle 38 extends a distance from the respective end of the bore 34 to couple to a respective end of the locking bail 12.

Figure 6:
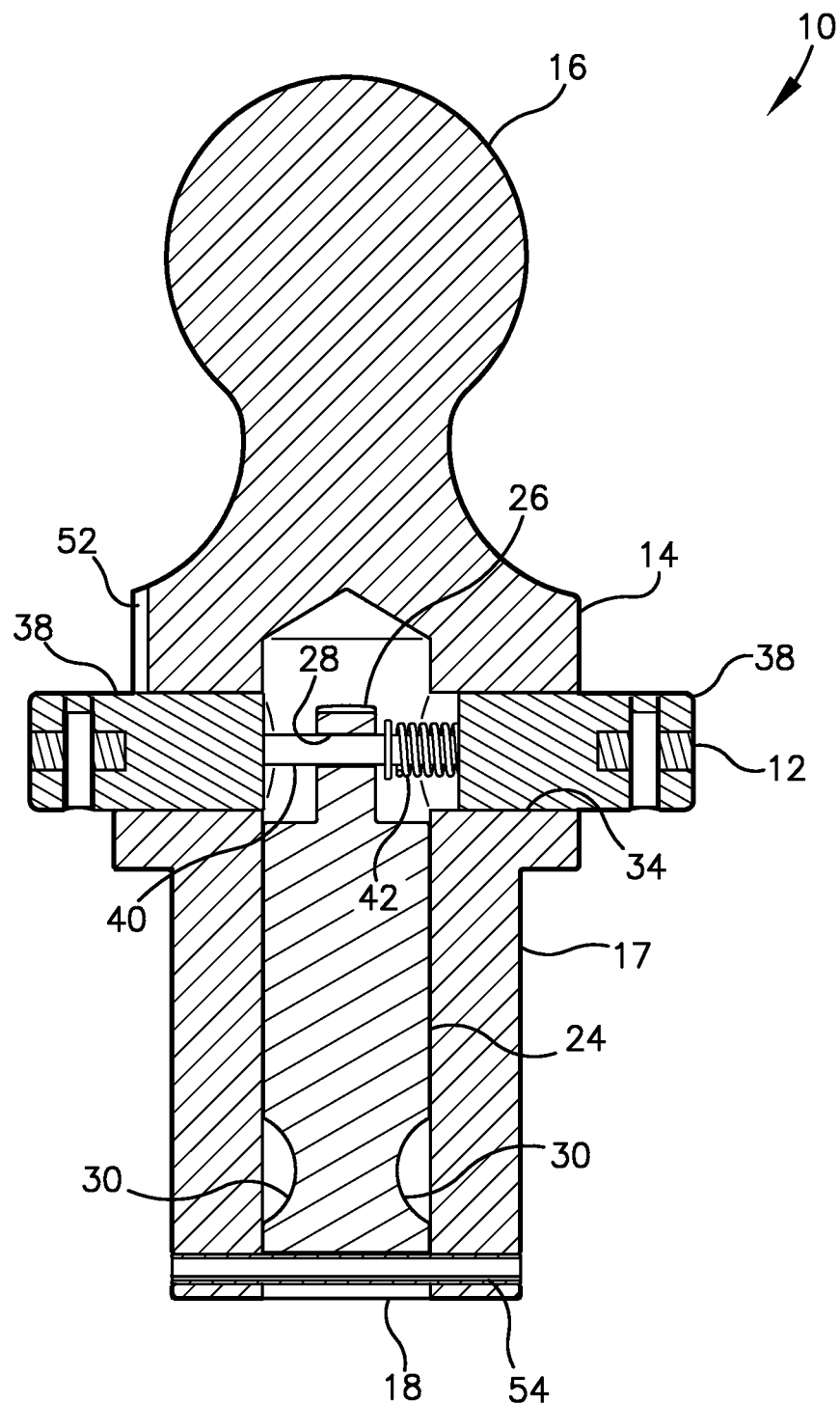
FIG. 6 is a cross-sectional front elevational view of the hitch ball taken generally along line 6-6 in FIG. 4.
Figure 7:
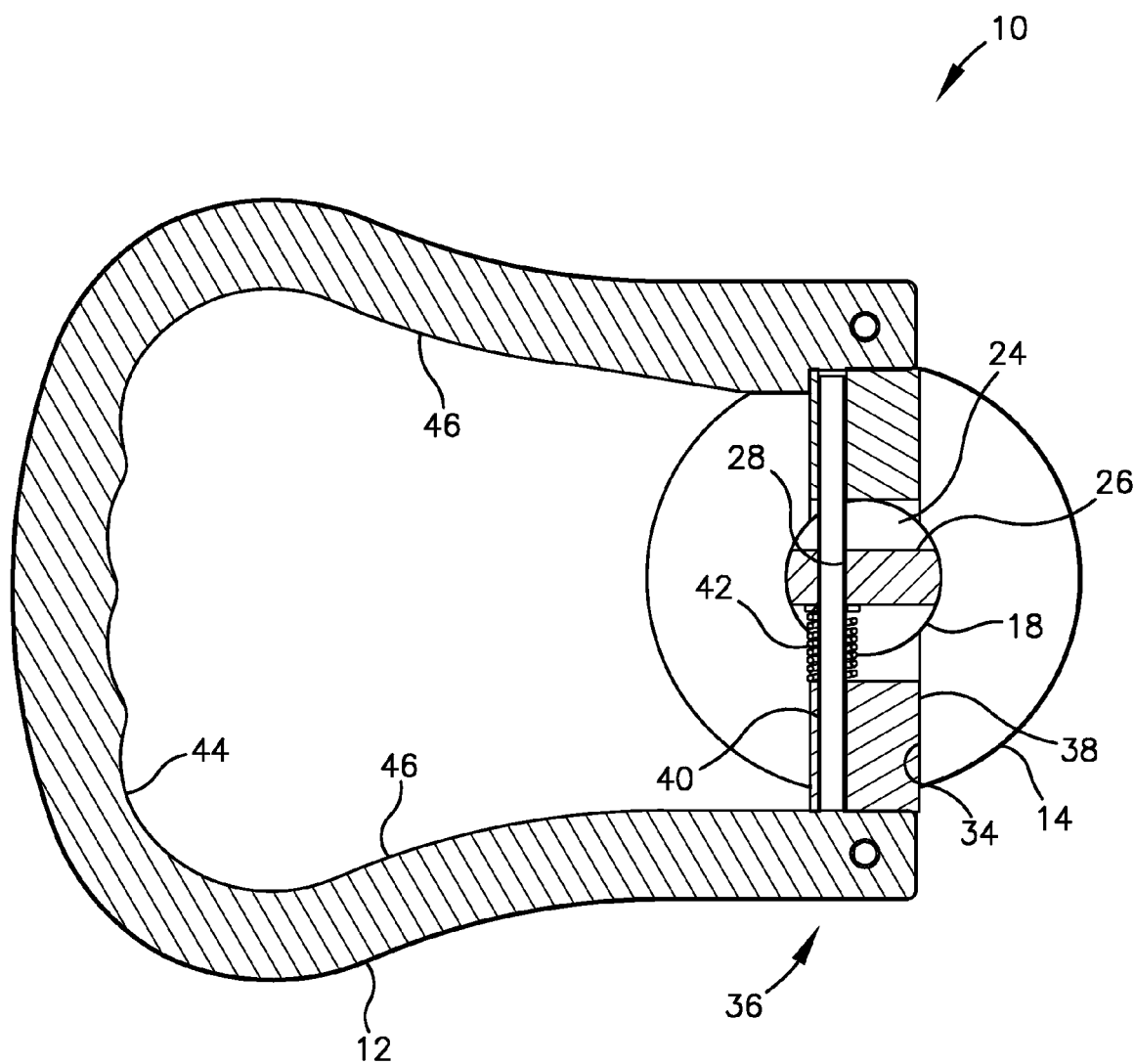
FIG. 7 is a cross-sectional top plan view of the hitch ball taken generally along line 7-7 in FIG. 5.

A cam pin 40 is connected at opposite ends to the bail axles 38 and extends therebetween. The spacing between inward facing ends of the bail axles 38 is wider than the diameter of the locking piston 24. The cam pin 40 is oriented parallel to but offset from the axis of the bore 34 and may be described as eccentrically mounted between the bail axles 38 and relative to the axis of bore 34. The cam pin 40 passes through the oblique slot 28 in the tab 26 of the locking piston 24. A biasing member, such as a coil spring 42, is disposed around the cam pin 40 between the tab 26 and one of the bail axles 38. The spring 42 thus biases the bail axles 38, and thus the actuation assembly 36 toward one end of the bore 34 as depicted in FIGS. 3, 6, and 7.

The locking bail 12 comprises a U-shaped lever having a cross-member 44 with a leg 46 extending from each end thereof and coupling to a respective bail axle 38. Other configurations or forms of levers 12 can be employed without departing from the scope of embodiments of the invention described herein. For example, it is foreseen that the lever 12 may include a single leg extending from one side of the hitch ball with a handle of the lever 12 projecting outward from a distal end thereof instead of having a cross-member extending between a pair of legs to form a bail. In the embodiment shown, the cross-member 44 and the legs 46 are dimensioned such that the locking bail 12 can extend from each bail axle 38 and over the top of the ball-mount 16 when the actuation assembly 36 is in the unlocked orientation (FIGS. 1-3). The locking bail 12 is preferably dimensioned to provide sufficient space between the ball-mount 16 and the cross-member 44 of the locking bail 12 when in the unlocked orientation to enable insertion of a user's hand or fingers therebetween. The cross-member 44 may include one or more gripping features 48 to increase comfort and/or aid grasping the cross-member 44 by hand.

The hitch ball body 14 includes a horizontal detent or notch 50 which extends radially outward from the bore 38 and is engageable by a proximate leg 46 of the bail 12 when the bail 12 is in the locked orientation, the leg 46 being urged into the notch 50 by the action of the coil spring 42. The coil spring 42 is positioned between the tab 26 and the bail axle 38 on a side of the tab 26 opposite the horizontal notch 50 so that the spring 42 urges the bail axles 38 and bail 12 in a direction which advances the proximate leg 46 of bail 12 into the horizontal notch 50. Similarly, the hitch ball body 14 may also include a vertical detent or notch 52 which extends radially outward from the bore 38 and is engageable by a leg 46 of the bail 12 when the bail 12 is in the unlocked orientation. Again, the leg 46 is urged into the notch 52 by the action of the coil spring 42. Alternatively, the locking bail 12 may simply be biased to rest against and/or slide along the exterior surface of the body 14 when not in the locked orientation.

Together, the locking bearings 22, piston 24, bail axles 38, cam pin 40, and coil spring 42, acting within the hollow 18, ports 20 and transverse bore 34 of the hitch ball body 14 comprise an embodiment of a locking mechanism for retaining the base 17 of the hitch ball 10 in the hitch receiver of a vehicle. The locking mechanism is operated by the locking bail 12 to change the locked or unlocked condition of the locking mechanism.

The hitch ball 10 may further include a security pin 54 that extends across the hollow 18 below the piston 24 in a position closely spaced to the bottom of the piston 24 when the piston 24 is in the locked orientation. The security pin 54 acts to prevent the piston 24 from falling or traveling out of the hollow 18 and thereby inadvertently releasing the ball 10 from the receiver upon failure of other parts of the latching mechanism, such as breakage of the cam pin 40. Under such circumstances, the security pin 54 will retain the piston 24 in the locked orientation, allowing the hitch ball 10 to remain safely locked in position. The security pin 54 may be, for example, a roll pin driven through aligned openings in the hitch ball body 14.

With continued reference to FIGS. 1-7, installation of the hitch ball 10 in a properly equipped towing vehicle is described in accordance with an embodiment of the invention. The hitch ball 10 is initially in or is placed in the unlocked orientation as depicted in FIGS. 1-3. In the unlocked orientation, the locking bail 12 and/or the cross-member 44 thereof can function as a handle for lifting, carrying, and otherwise handling the hitch ball 10. Because the locking bail 12 is not in contact with, and does not form a part of the contact surfaces between the hitch ball 10 and the trailer coupler or hitch assembly to be coupled to the hitch ball 10, the bail 12 can remain relatively clean and free of grease and grime. Users are thus provided with a clean surface for handling the hitch ball 10.

The base 17 of the hitch ball 10 is inserted into a receiver in the tow vehicle (not shown). The actuation assembly 36 is then operated to lock the hitch ball 10 into the receiver. The locking bail 12 is pivoted to rotate the bail axles 38 within the transverse bore 34. The rotation moves the cam pin 40 along an arcuate path about the axis of rotation of the bail axles 38. Engagement of the cam pin 40 in the oblique slot 28 in the locking piston 24 causes the locking piston 24 to move within the hollow 18 toward the bottom end of the hitch ball 10 as the cam pin 40 moves through the arcuate path.

In the unlocked orientation, the annular depression 30 in the locking piston 24 is aligned with the ports 20 to enable free movement of the locking bearings 22 into the hitch ball body 14 and into the hollow 18 such that the locking bearings 22 do not protrude outwardly from exterior of the hitch ball 10. As the locking piston 24 is moved downwardly the locking bearings 22 are forced radially outward out of and away from the hollow 18. The locking bearings 22 are thus moved to at least partially protrude from the ports 20 and to engage the corresponding features of the receiver in the tow vehicle. The receiver includes one or more features configured to align with and receive at least a portion of the locking bearings 22 that protrude from the hitch ball body 14. Engagement of the locking bearings 22 with the receiver prevents withdrawal of the hitch ball 10 from the receiver.

Upon complete or nearly complete pivoting of the locking bail 12 to the locked orientation, the locking bail 12 aligns with the notch 50 or a similar feature on the hitch ball body 14. The bias provided by the spring 42 moves the bail axles 38 transverse to the hitch ball body 14 and thereby draws the locking bail 12 into the horizontal notch 50. The notch 50 is configured and dimensioned to receive at least a portion of the proximate leg 46 of the locking bail 12 therein and to resist further pivotal movement of the locking bail 12 while engaged with the notch 50.

As depicted in FIGS. 4-7, in the locked orientation the locking bail 12 is positioned generally perpendicular to the hitch ball body 14 of the hitch ball 10 so as not to impede or obstruct coupling of a trailer or hitch assembly with the ball-mount 16. The hitch ball 10 is substantially prevented from unlocking or decoupling from the receiver in the tow vehicle by both engagement of the locking bail 12 with the notch 50 and by obstruction of movement of the locking bail 12 by the presence of a trailer coupler or hitch assembly 60 coupled to the ball-mount 16, e.g. the locking bail 12 is prevented and obstructed from moving to the unlocked orientation by the trailer coupler or hitch assembly 60 as can be discerned from FIG. 5.

To remove the hitch ball 10 from the receiver in the tow vehicle, the trailer or hitch assembly must first be decoupled therefrom and removed. The locking bail 12 is next moved transversely to the hitch ball body 14 to slide the bail axles 38 within the transverse bore 34 against the bias of the spring 42. The locking bail 12 is moved transversely a sufficient distance to disengage the notch 50. The locking bail 12 can then be pivoted upwardly or toward the ball-mount 16 to: rotate the bail axles 38, move the cam pin 40 in a reverse direction along the arcuate path, draw the locking piston 24 upwardly toward the ball-mount 16 via interaction of the cam pin 40 with the oblique slot 28, and realign the arcuate depression 30 with the ports 20. The locking bearings 22 can again recede into the hitch ball 10 to disengage with the receiver and enable withdrawal of the base 17 of the hitch ball 10 therefrom. The locking bail 12 is thus again placed in a position that is easily useable as a handle for withdrawing the hitch ball 10 from the receiver in the tow vehicle and for handling the hitch ball 10 as desired. In the unlocked orientation, the proximate leg 46 of the bail 12 will align with the vertical notch 52 (if one is provided) and be urged into the notch 52 by the spring 42. Engagement of the leg 46 with a notch 52 in the unlocked position merely acts as a convenience by preventing the bail 12 from moving unexpectedly during carrying, storage or reinsertion of the hitch ball 10 into the receiver. The notch 52 is not considered to be essential to the operation of the hitch ball 10.

Many different arrangements of the various components depicted, as well as components not shown, are possible without departing from the scope of the claims below. It is to be understood that when the locking mechanism is in the unlocked orientation, the bail 12 could extend at an orientation other than overlying the ball mount 16 to interfere with coupling of a trailer coupler to the ball mount 16. For example, if the bail 12 is angled and locked in place so that the cross member 44 extends in alignment with the neck of the hitch ball 10 between the ball mount 16 and base 14, so that the bail would prevent the trailer couple from passing over the ball mount 16, the bail 12 would interfere with coupling of a trailer coupler to the ball mount 16.

Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to demarcate those structures as including a plurality of possible arrangements or designs within the scope of this disclosure and readily identifiable by one of skill in the art to perform the particular function in a similar way without specifically listing all such arrangements or designs. Certain features and sub-combinations are of utility and may be employed without reference to other features and sub-combinations and are contemplated within the scope of the claims.

What is claimed is:

1. A hitch ball to which a trailer coupler may be secured for coupling a trailer to a tow vehicle, the hitch ball comprising:
    a hitch ball body with a ball-mount disposed on a first end and a base forming a second end opposite the first end, the base being configured for receipt by a receiver disposed in the tow vehicle;
    a locking mechanism that is actuatable between a locked and an unlocked orientation, in the locked orientation the locking mechanism preventing withdrawal of the base from the receiver; and
    a lever pivotably coupled to the hitch ball body and pivotable to move the locking mechanism between the unlocked orientation and the locked orientation, the lever extending in interfering relationship with the ball mount and preventing coupling of a trailer coupler with the ball-mount when the locking mechanism is in the unlocked orientation and the lever extending in non-interfering relationship with the ball mount and allowing coupling of a trailer coupler with the ball-mount when the locking mechanism is in the locked orientation,
    wherein a trailer coupler coupled on the ball-mount prevents pivoting of the lever and advancement of the locking mechanism from the locked orientation to the unlocked orientation.

2. The hitch ball of claim 1 wherein, when the locking mechanism is in the unlocked orientation, a portion of the lever overlies the ball mount.

3. The hitch ball of claim 1, wherein the lever is operable as a handle for handling the hitch ball, the lever providing sufficient space between the lever and the ball mount for insertion of a user's fingers therebetween when the locking mechanism is in the unlocked orientation.

4. The hitch ball of claim 1, wherein the lever provides a visual indication of a locked or unlocked orientation of the locking mechanism.

5. The hitch ball of claim 1, wherein the lever is pivotable about an axis and is moveable parallel to the axis in an axial direction, and wherein the lever is biased to move in the axial direction to engage a notch in the hitch ball body when advanced to non-interfering relationship with the ball-mount.

6. The hitch ball of claim 1, wherein the locking mechanism comprises a locking follower disposed in a hollow within the hitch ball body, pivoting of the lever into interfering relationship with the ball-mount moves the locking follower within the hollow to align a depression in the locking follower with a port in the base to enable a locking element to move at least partially into the depression, and pivoting of the lever into non-interfering relationship with the ball-mount moves the locking follower within the hollow to align a sidewall of the locking follower with the port and to retain the locking element in a position at least partially protruding from the base of the hitch ball.

7. The hitch ball of claim 1, wherein the lever comprises a U-shaped bail.

8. A hitch ball to which a trailer coupler may be secured, the hitch ball comprising:
    a hitch ball body with a hollow extending into a first end;
    a locking piston disposed in the hollow;
    a port extending through an exterior surface of the hitch ball body to the hollow;
    a locking element disposed in the port;
    an actuation assembly coupled to the hitch ball body and having a lever that is pivotable about an axis extending substantially transversely to the hollow to move the locking piston within the hollow between a locked and an unlocked position, in the locked position the locking piston retains the locking element in a position at least partially protruding from the exterior surface of the hitch ball, and in the unlocked position the locking piston enables the locking element to be completely received within the hitch ball body,
    wherein the lever is coupled to the hitch ball body via an axle disposed in a transverse bore extending at least partially through the hitch ball body and intersecting the hollow, the axle including a cam pin that extends from an end of the axle toward the hollow, the cam pin extending parallel to and offset from an axis of rotation of the axle.

9. The hitch ball of claim 8, wherein the lever comprises a U-shaped bail that extends past a ball-mount disposed on a second end of the hitch ball body when the locking piston is in the unlocked position and is operable as a handle for handling the hitch ball.

10. The hitch ball of claim 8, wherein the lever prevents coupling of a trailer coupler to the hitch ball when the locking piston is in the unlocked position.

11. The hitch ball of claim 8, wherein the locking piston includes an oblique slot that is engaged by the cam pin, and wherein movement of the lever rotates the axle about the axis of rotation, moves the cam pin along an arcuate path, and moves the locking piston within the hollow between the locked and unlocked positions.

12. The hitch ball of claim 8, wherein the locking piston includes a depression having dimensions suitable to at least partially receive the locking member therein, the depression being substantially aligned with the port when the locking piston is in the unlocked position, and the depression being substantially offset from the port when the locking piston is in the locked position.

13. The hitch ball of claim 8, wherein the lever is coupled to the hitch ball body via an axle disposed in a transverse bore extending at least partially through the hitch ball body, the axle being moveable axially within the transverse bore, and further comprising a biasing member operatively coupled to the axle to bias the axle in a first axial direction.

14. The hitch ball of claim 13, wherein movement of the axle in the first axial direction engages the lever with a notch in the hitch ball body to resist pivotal movement of the lever.

15. The hitch ball of claim 14, wherein the locking piston is in the locked position and the lever is engaged with the notch.

16. The hitch ball of claim 14, wherein the lever is operable to move the axle in a second axial direction that is opposite the first axial direction to disengage the lever from the notch and to enable pivotal movement of the lever.

17. A hitch ball to which a trailer coupler may be secured for coupling a trailer to a tow vehicle, the hitch ball comprising:
    a hitch ball body with a hollow extending into a first end;

a locking piston disposed in the hollow, the locking piston having a length that extends parallel to and coaxially with the hollow and including an oblique slot extending transversely to the length and a depression in a sidewall;
a port extending through an exterior surface of the hitch ball body to the hollow;
a locking element disposed in the port; and
a locking bail that is pivotably coupled to the hitch ball body via an axle, the axle disposed in a transverse bore extending through the hitch ball body and intersecting the hollow, the locking bail being pivotable to move the locking piston within the hollow between a locked and an unlocked position, in the locked position the locking piston retains the locking element in a position at least partially protruding from the exterior surface of the hitch ball, and in the unlocked position the locking piston enables the locking element to be completely received within the hitch ball body and at least partially into the depression.

18. A hitch ball to which a trailer coupler may be secured, the hitch ball comprising:
a hitch ball body with a hollow extending into a first end;
a locking piston disposed in the hollow;
a port extending through an exterior surface of the hitch ball body to the hollow;
a locking element disposed in the port;
an actuation assembly coupled to the hitch ball body and comprising a lever extending from an axle rotatably mounted within an axle receiver extending into the hitch ball body substantially transversely to the hollow and a cam pin connected to the axle and engaging the locking piston to move the locking piston within the hollow between a locked and an unlocked position as the lever and axle are rotated between first and second pivotal orientations relative to the hitch ball body, wherein in the locked position the locking piston retains the locking element in a position at least partially protruding from the exterior surface of the hitch ball, and in the unlocked position the locking piston enables the locking element to be completely received within the hitch ball body, and wherein the axle is moveable axially within the axle receiver, and a biasing member is operatively coupled to the axle to bias the axle in a first axial direction.

* * * * *